(12) United States Patent
Kulikowski et al.

(10) Patent No.: US 11,443,075 B2
(45) Date of Patent: Sep. 13, 2022

(54) SECURE STORAGE SYSTEM

(71) Applicant: GIESECKE+DEVRIENT MOBILE SECURITY GMBH, Munich (DE)

(72) Inventors: Jens Kulikowski, Oberding (DE); Soenke Schroeder, Munich (DE)

(73) Assignee: SECUNET SECURITY NETWORKS AG, Essen (DE)

(*) Notice: Subject to any disclaimer, the term of this patent is extended or adjusted under 35 U.S.C. 154(b) by 105 days.

(21) Appl. No.: 16/468,030

(22) PCT Filed: Nov. 30, 2017

(86) PCT No.: PCT/EP2017/001398
§ 371 (c)(1),
(2) Date: Jun. 17, 2019

(87) PCT Pub. No.: WO2018/103883
PCT Pub. Date: Jun. 14, 2018

(65) Prior Publication Data
US 2020/0012823 A1    Jan. 9, 2020

(30) Foreign Application Priority Data

Dec. 9, 2016   (DE) .......................... 102016014667.2

(51) Int. Cl.
| G06F 21/78 | (2013.01) |
| G06F 12/14 | (2006.01) |
| H04L 9/08 | (2006.01) |
| G06F 21/86 | (2013.01) |

(52) U.S. Cl.
CPC .......... *G06F 21/78* (2013.01); *G06F 12/1408* (2013.01); *H04L 9/0897* (2013.01); *G06F 21/86* (2013.01); *G06F 2212/1052* (2013.01)

(58) Field of Classification Search
CPC ..... G06F 21/78; G06F 12/1408; H04L 9/0897
See application file for complete search history.

(56) References Cited

U.S. PATENT DOCUMENTS

| 8,156,322 | B2 | 4/2012 | Asnaashari | |
| 9,684,898 | B2 | 6/2017 | Paya | |
| 9,871,663 | B2 | 1/2018 | Pearson | |
| 2007/0239990 | A1* | 10/2007 | Fruhauf | G06F 21/80 |
| | | | | 713/185 |
| 2015/0351145 | A1* | 12/2015 | Burks | H04W 4/80 |
| | | | | 455/41.3 |
| 2016/0094526 | A1* | 3/2016 | Shaw | H04L 63/0428 |
| | | | | 713/154 |
| 2017/0032108 | A1* | 2/2017 | Amaral Cid | H04L 9/06 |

FOREIGN PATENT DOCUMENTS

WO        2003012606 A      2/2003

* cited by examiner

*Primary Examiner* — Noura Zoubair
(74) *Attorney, Agent, or Firm* — Andrew Wilford

(57) ABSTRACT

A secure storage system having authentication and cryptographic data protection is made by providing a mass-data memory and a security element communicatively coupled with the mass-data memory. This mass-data memory and the securing element are controlled by respective different control commands such that different drivers can be installed to operate the mass-data memory and the security element. A secured hardware data interface is provided between the mass-data memory and the security element, and the security element provides security-critical information concerning the data of the mass-data memory.

12 Claims, 2 Drawing Sheets

SECURE STORAGE SYSTEM

CROSS REFERENCE TO RELATED APPLICATIONS

Figure 1:
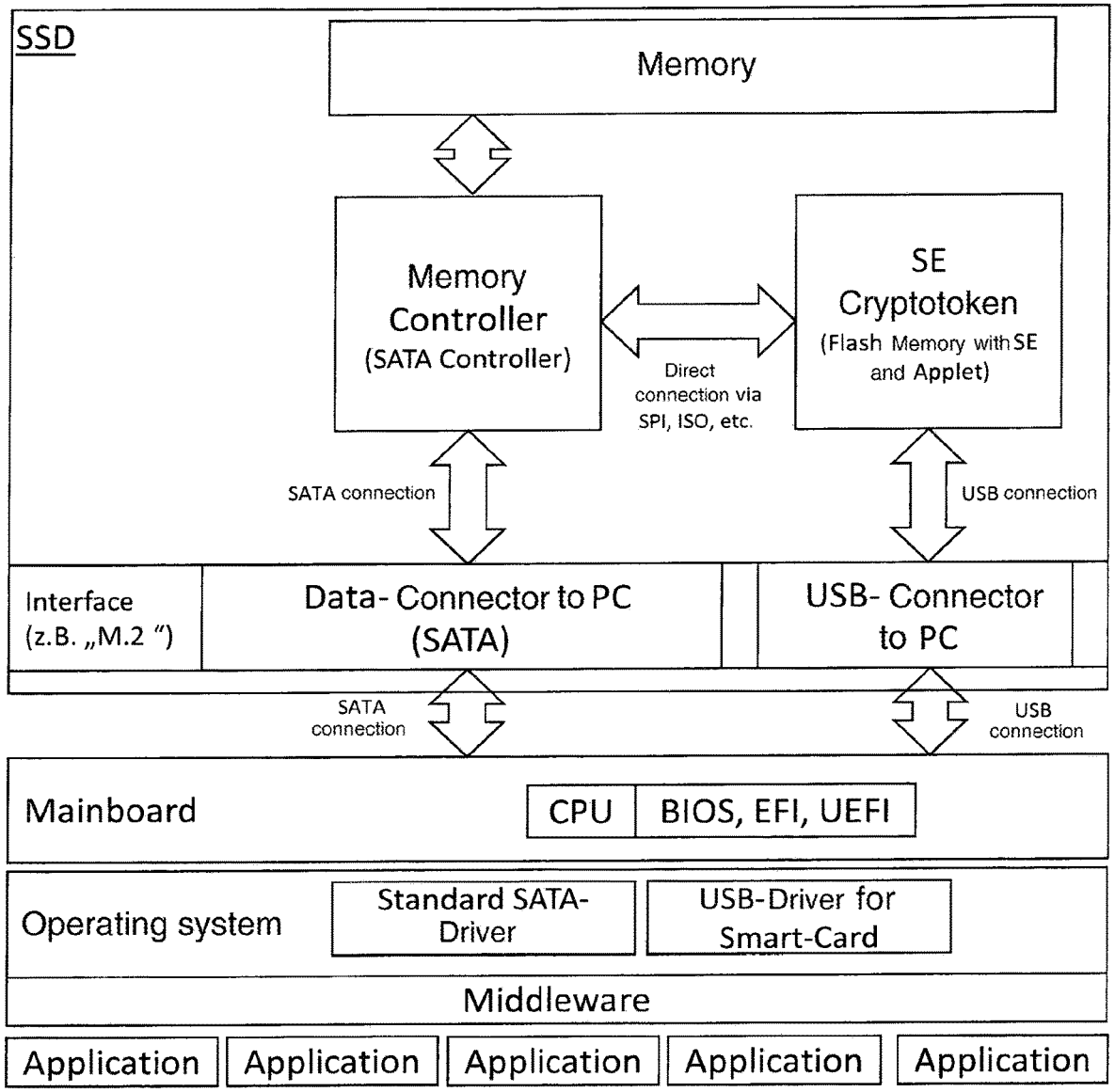

This application is the US-national stage of PCT application PCT/EP2017/001398 filed 30 Nov. 2017 and claiming the priority of German patent application 102016014667.2 itself filed 9 Dec. 2016.

The present invention relates to a storage system for secure authentication comprising a mass-data memory and a security element that enables the secure authentication of a storage system in the presence of further hardware components without the need for substantial technical effort and expense. The present invention further relates to a corresponding method of providing or producing the proposed storage system and to a computer program product comprising control commands that carry out the proposed method.

US 2014/0089196 [U.S. Pat. No. 9,684,898] discloses a secure data memory for a computer terminal. There, a PIN is used to secure the secure memory.

Various cryptographic methods are also known that make it possible to encrypt contents of for example a hard disk. To this end, access to the data memory or its contents is controlled by software technology, but this can pose a security risk. Furthermore, a so-called middleware software or a driver software is known that makes it possible to set appropriate access rights in the framework of rights management.

Furthermore, secure boot is also known, as well as certain mechanisms that can protect a data memory against unauthorized access or manipulation by hardware or software. An example of a possible security mechanism is the so-called one-time password (OTP) that makes it possible to gain access to a secure area only once, whereupon the password becomes invalid. This prevents so-called man-in-the-middle attacks that do not allow an attacker to intercept and feed a data communication back in during an authentication process. If a corresponding authentication process is intercepted and corresponding passwords are provided again for further authentication, no access is granted, because the password has already been used up.

According to conventional methods, the so-called Trusted Platform Module TPM is used that can be present as a chip that adds security functionality to a computer or similar devices. However, this chip does not protect the boot process of a corresponding terminal and typically cannot be managed such that a new version of control commands can be loaded. Hardware devices such as dongles are known that carry a license key and are plugged into a personal computer via a USB port, for example. Typically, such dongles are not rewritable and are also simply not connected securely to the corresponding hardware.

Therefore, it is a disadvantage of known methods that either software protection mechanisms are used that can be bypassed or manipulated because they are written in a memory that can be addressed by other functions, or there is a hardware protection mechanism that, however, is not directly connected to the corresponding hardware and may possibly be lost.

It is thus known to provide a secure element in the form of a USB stick or smart card that is connected to a personal computer. Thus, this is generally accessible to anyone from outside the PC case and can also be lost or simply stolen. Furthermore, it is particularly disadvantageous the corresponding hardware device wears out, which can result in the destruction of the corresponding security device.

The identity of the associated terminal is thus lost as a result of possible loss or failure. Reliable one-to-one identification is thus no longer possible. Continuous professional use is therefore neither topical nor practicable, since some application scenarios, such as environmental conditions in the industrial environment, for example, do not allow for such a design.

A smart-card terminal and its key required for encryption, is typically only available in software on a PC. Other known methods, such as TPM and TrustZone described above, cannot be updated and are therefore not manageable. Longer security keys or new algorithms can be reloaded, but the security level is static. So-called MAC addresses, CPU identities, and motherboard identities can generally be changed and are therefore not secure.

It is therefore an object of the present invention to provide a security mechanism, for example in a storage system that makes it possible to secure a mass-data memory with little technical effort and expense and to provide authentication of a mass-data memory in relation to further computing components. Furthermore, it is an object of the present invention to provide a corresponding method of making the proposed security mechanism and/or storage system. Furthermore, it is an object of the present invention to provide a computer program product with control commands that carry out the proposed method.

The object is achieved by a storage system with the features according to claim 1. Additional advantageous embodiments are described in the subclaims.

Accordingly, a method of making a secure storage system having unequivocal authentication and cryptographic data protection is proposed that comprises the steps of providing a mass-data memory, providing a security element communicatively coupled with the mass-data memory, a secured data interface being interposed between the mass-data memory and the security element, and the security element providing security-critical information concerning the data of the mass-data memory. A person skilled in the art recognizes that the above-described steps can be carried out in a different order and can optionally have substeps. Optionally or alternatively, the security feature is coupled with the device in which the mass-data memory is installed. The coupling can be accomplished via one or more possibly different interfaces.

According to the invention, a conventional mass-data memory can be prepared in such a way that the security element verifies the data of the mass-data memory or for example executes cryptographic operations on the data of the mass-data memory. Such cryptographic operations need not be performed directly by the security element per se, but rather can also only be initiated by the security element.

The security element is specially secured, to which end structural and logical protection mechanisms are provided that protect the data of the security element. The security element can be a hardware component having a secure data memory and execution environment. A secure execution environment includes, for example, an operating system or hardware components that can execute arithmetic operations. The hardware used can be provided depending on the selection of the security element. It is thus possible to arrange a chip of the security element together with a chip of the mass-data memory on a single board as a so-called chip stack, or to constitute the security element as a secure core in the hard disk controller itself.

Thus, it is especially advantageous according to the invention if a mass-data memory with a secured unit, namely the security element, can be upgraded, thereby maintaining data integrity and confidentiality. Consequently, the security element makes it possible to securely authentify the mass-data memory in relation to other components or to cryptographically secure data.

In addition, it is possible to securely identify the hard disk or the device on which it is installed.

According to a feature of the present invention, the safety-critical information is present as an access authorization, an identity of the mass-data memory, a cryptographic key, a data signature, a time stamp, and/or a validity period of data. This has the advantage that access to the mass-data memory can be granted or denied based on the security element. It is also possible to sign requested data from the mass-data memory in such a way that its data integrity can be determined by another component. The access authorization or the data signature can also be provided with a validity period, that specifies how long an access authorization should exist or a data signature is valid. In this case, a relative validity period starting from a time stamp can apply, or else an end time can be specified at which the access authorization or the signature is to expire.

According to another feature of the present invention, the unique key is used for secure encryption and/or decryption of mass storage data. This has the advantage that the security element itself performs encryption and/or decryption or at least initiates it. The security element is capable of providing a trusted key that can be used as cryptographic information for encryption and decryption. A secure cryptographic key can thus be generated and used independently of the data of the mass-data memory.

According to another feature of the present invention, the security-critical information is generated and/or stored by the security element. This has the advantage that the security element provides both a reliable memory since it is secure and also that a cryptographic key can be generated at runtime. The security element can thus provide at least one arithmetic and logic unit enabling a cryptographic algorithm to generate security-critical information. Thus, it is also possible to not always use the same security-critical information, but rather to generate new information or a new key at any time.

According to another feature of the present invention, the security element provides control commands. This has the advantage that the security element can provide a memory for applications that make it possible for additional logic to be carried out that secure the mass-data memory or its data. Security operations can thus be stored in the security element and executed. It is also possible to update or expand the control commands of the security element. The security element can also have an operating system that can then be updated and expanded.

According to another feature of the present invention, at least a part of the security element is on a circuit board together with a kind of mass-data memory. This has the advantage, for example, that a chip of the security element can be integral with the chip of the mass-data memory on a circuit board in such a way that a so-called chip stack is formed.

According to another part of the present invention, the secured data interface is provided using network components. This has the advantage that even a remote data memory stored in a server can be secured according to the invention. Thus, therefore, the mass-data memory and the security element are not communicatively connected directly, but rather indirectly by network components in such a way that the mass-data memory communicates with the security element, for example via the internet.

The object is also achieved by a secure storage system with unequivocal authentication with cryptographic data protection, comprising a mass-data memory, a security element communicatively coupled with the mass-data memory, a secured data interface being interposed between the mass-data memory and the security element, and the security element being configured to provide security-critical information concerning the data of the mass-data memory.

The present invention overcomes the disadvantage that a so-called Trusted Platform Module TPM often cannot be used in industrial computer systems, since such PCs have a long life cycle and the so-called Trusted Platform Module is difficult to manage. As an alternative, the invention proposes the integration of an embedded security element, i.e. of an embedded secure element eSE. Such a security element can be found on the main board of a computer, for example. Preferably, however, the security element is on a removable medium of a computer, preferably a solid state disk SSD. Thus, according to one aspect of the present invention, a computer hard disk with integrated security element is achieved. Safety-critical operations can thus be requested directly from the PC, and the interface to the mass-data memory can be secured. Consequently, certificates, keys, and the like can be stored in this secure mass-data memory, i.e. on the proposed storage system. For this purpose, it is proposed to support cryptographic functions that also support verification of signatures or also authentication. The licensing of a software can thus be managed, for example.

Furthermore, according to one aspect of the present invention, a storage system for secure authentication is proposed. A mass-data memory is provided here; a security element is communicatively coupled with the mass-data memory, and the security element provides unique authentication information on the basis of which the mass-data memory can be unequivocally authentified relative to other computer components.

According to the invention, a storage system is any device that comprises a data memory, preferably a mass-data memory, and is typically both readable and writable. Such a mass-data memory can be a so-called solid-state disk SSD, or also a conventional hard disk HDD. A conventional hard disk is generally a data memory that provides two or three disks on which data is stored magnetically. However, a person skilled in the art also knows other mass-data memories that can be used according to the invention. For example, they can include USB sticks or also SD cards of any type. A mass-data memory provides a storage capacity of typically at least 64 MB, with typical manifestations offering storage capacities of between 1 GB and 3 TB. Therefore, the feature of a mass-data memory is not to be understood by any means as limitative; on the contrary, a person with average skill in the art will recognize that this is generally a data storage unit available to consumers. What is more, further developments fall under the concept of a mass-data memory, since it is to be expected that storage capacities will also increase in the future to the effect that a multitude of TBs will be able to be stored.

Secure authentication can be achieved by the storage system in conjunction with an authentication authority. In this respect, it is possible according to the invention for authentication information or authentication information to be provided by the security element and for the corresponding information to be transmitted to a higher-level element. Thus, it is possible to provide device identification by the security element unique with respect to the mass-data memory. The mass-data memory thus authenticates itself to an authentication authority indirectly via the security element.

In this respect, it is possible for example for the corresponding location to be installed on a personal computer or also on a network. The mass-data memory can thus be verified, and booting of an operating system can only be carried out if the corresponding mass-data memory storing the control commands of the operating system is also properly authentified. According to conventional techniques, every computer can be powered up with any hard disk having corresponding boot sectors and other control instructions provided by the operating system. However, conventional methods do not ensure that it is exactly the data carrier also provided for this purpose is also booted. In one attack scenario, for instance, the bootable disk is replaced in a computer and an operating system is loaded by control commands actually not authorized for that purpose.

It is therefore an advantage of the present invention that the mass-data memory can be authentified by the security element in relation to other components in a computer and/or on a computer network. Thus, when the computer is switched on, the security element can first be checked and the mass-data memory accessed for booting, for example, only in case of a positive check.

For example, it is possible for the mass-data memory, together with the security element, i.e. the storage system, to be connected to a main board of a computer. It can already be established in a BIOS which data carrier is allowed to operate the corresponding computer. For instance, a white list with device identifier can thus be stored in a data memory of a main board that describes terminals permitted according to the invention to operate the computer. If the computer is now turned on, this BIOS that can also be constituted as middleware or generally as a driver, can be loaded, for example, and this motherboard-side BIOS accesses the security element of the data carrier according to the invention. Subsequently, authentication of the storage system according to the invention takes place in the BIOS of the main board. Corresponding boot sectors are read and the operating system is loaded only if the corresponding mass-data memory is also listed on the white list of the motherboard. This ensures according to the invention that only authorized data carriers execute or provide certain control commands.

In particular, it is advantageous in this respect that the security element be disposed in such a way relative to the mass-data memory that these two components are inseparable. This makes it impossible to separate the security element from the mass-data memory in a nondestructive manner. A person skilled in the art recognizes how such a connection can be established according to the invention. For example, the two components, i.e. the mass-data memory and the security element, can be integrally formed or also provided as a module. It is also possible for both the mass-data memory and the security element to be on a circuit board. This ensures that the security element is never separated from the mass-data memory and that authentication of the mass-data memory is always possible according to the invention. Additional locking mechanisms can be provided that, if the security element is detached or manipulated, lock the mass-data memory.

The security element can be a hardware device particularly designed to be tamper-proof. It is thus advantageous for the security element to be embodied such that it shares no memory with other components, i.e. that no so-called shared memory be provided. This prevents unauthorized components from accessing the data memory of the security element and thus writing or manipulating data in an unauthorized manner. Furthermore, according to another aspect, the security element is embodied in such a way that special software measures ensure that manipulation can be ruled out. Again, these can be cryptographic algorithms or security software in general.

Furthermore, it is advantageous for data lines to be configured such that they are used exclusively by the security element and only a specially secured external bus is provided. In general, a security element can be constituted as a so-called secure element SE.

Examples of other application scenarios include security features in the form of a UICC or an eUICC. According to the invention, these can also be used as a security element in the existing data memory. For instance, a security element can be constituted as a secure element that can be integrated into conventional cell phones.

This protects important data such as PIN codes, pictures, SMS, and more. They are a component in the development of new technologies such as NFC, since such data are extremely sensitive. For example, such a security element can exist as a MicroSD card or as an integrated SIM. However, these devices are adapted according to the invention such that they are integrally or inseparably connected to the mass-data memory.

The coupling of the security element with the mass-data memory can be effected such that a data line is provided between the mass-data memory and the security element that can be part of a bus system. In that case, it is particularly advantageous to protect the corresponding data line in such a way that the unequivocal authentication information can be exchanged without adulteration between the security element and the mass-data memory. In an alternative embodiment, it is also possible for mass-data memory and the security element to be separated from one another such that the transmission of the authentification information takes place between the security element and a component outside the mass-data memory. In a preferred embodiment, however, the storage system is embodied such that the security element is communicatively connected to the mass-data memory in such a way that control commands can be stored in the mass-data memory that check whether the security element is actually present or whether the unique authentification information can be read out. An interface to external components can thus be provided that can read out both the mass-data memory and the security element.

The mass-data memory can, in turn, also be subdivided in such a way that the mass-data memory comprises both memory units as well as other control components, such as microcontrollers, for example that provide a corresponding logic that accesses the memory units. It is thus possible to implement the data storage of the security element and the mass-data memory separately and still provide a uniform interface that can read out the security element as well as the mass-data memory. A person skilled in the art will recognize additional manners in which the security element and the mass-data memory can be coupled with one another.

Authentification takes place relative to further computer components typically outside the storage system. Such computer components can be components of a main board that check whether the mass-data memory being used actually corresponds to the expected mass-data memory. The proposed storage system for secure authentication can therefore also be referred to as a storage system for secure authentication. This is the case because the storage system or the proposed security element only provides the unique authentication information that, while generally provided for authentication, the step of authenticating is carried out only by the security element proposed according to the invention. Thus, the proposed storage system generally has the possibility of authentication but carries out only an authentication step itself, i.e. a step of providing the authentication information. According to the invention, additional authentication units can thus be provided that, in turn, are communicatively coupled with the security element in such a way that these authentication authorities or the authentication authority authentifies the mass-data memory using the security element and the unequivocal authentication information. Overall, a person skilled in the art recognizes that additional components already known are to be provided with the proposed storage system.

According to one aspect of the present invention, the mass-data memory and the security element have separate memory areas. This has the advantage that the security element can be specially secured in such a way that an especially security-relevant memory of the security element cannot be accessed by the mass-data memory. Thus, no shared memory is implemented, but rather each of the two components has its own physical storage systems. However, should a single physical storage system actually be provided for both components, i.e. the mass-data memory and the security element, they are separated at least by software. This can be achieved, for example, by independent address spaces in such a way that control commands from the mass-data memory cannot access a data memory of the security element, or, more particularly, rights management is carried out here. It is thus generally possible to design the memory area of the security element in such a way that only read the memory is set to read-only.

According to another aspect of the present invention, the mass-data memory and the security element have separate arithmetic and logic units or are driven by separate arithmetic and logic units. This has the advantage that a further security mechanism is implemented in such a way that the control logic of the security element is completely separated from the control logic of the mass-data memory. This, in turn, prevents manipulation of the respective units. Furthermore, it is possible to provide different hardware for each of the components involved.

According to another aspect of the present invention, the mass-data memory and the security element are inseparably interconnected. This has the advantage that it always ensures during an authentication process that the security element actually authentifies the intended mass-data memory. This avoids the drawback of the prior art of the security element being able to be removed from the mass-data memory or switched out.

Thus, a user always has the assurance that the security element will actually authentify the mass storage system intended for it.

According to another aspect of the present invention, the mass-data memory and the security element are on a circuit board. This has the advantage that the mass-data memory and the security element are integrally formed in such a way that they are provided as a single module and can also rely on a single bus system. The proposed storage system is thus carried out in an especially hardware-efficient manner. In this case, a circuit board is not to be understood as limiting; rather, a building block of the mass-data memory can be used to integrate the security element in this case. A circuit board is thus to be understood as being merely exemplary, since a mass-data memory typically has a corresponding circuit board.

According to another aspect of the present invention, the mass-data memory and the security element can each be controlled by separate control commands. This has the advantage that different drivers can be installed that operate either the mass-data memory or the security element. However, it is further ensured that a separate functionality can be implemented in such a way that no attacks can be carried out on the respective other device. For example, the mass-data memory can thus be implemented by conventional control commands, and the security element can be operated with an especially secure software or control commands. This also has the advantage that conventional mass data storage can be retrofitted accordingly without the need to re-implement corresponding control commands According to another aspect of the present invention, the mass-data memory and the security element are controlled by separate operating systems. This has the advantage that different operating systems can be reused, so different driver versions can be used for the security element and the mass-data memory. In particular, there are special operating systems that manage mass-data memories, so that the operating system of the security element can be implemented separately. Furthermore, it is thus possible to easily load updates of the control commands of the security element that, in turn, then make attacks more difficult. When adapting the operating system of the security element or the corresponding driver, the corresponding operating system of the mass-data memory therefore does not have to be disclosed or adapted.

According to another aspect of the present invention, the control commands that operate the security element are interchangeable. This has the advantage that the control logic of the security element are not stored in hard-coded form; instead, corresponding updates of the control commands can be loaded. Thus, the proposed security feature differs from known methods that provide hardware security mechanisms that, however, cannot be overwritten. It is especially advantageous according to the invention that the replacement of the control commands, i.e. an update, can also be carried out by an interface of the storage system. The control commands can also be updated by components that are outside the storage system.

According to another aspect of the present invention, the security element provides a list comprising computer components in relation to which the mass-data memory can be authentified. This has the advantage that a so-called white list can be provided that contains a list of trusted external components that can connect to the mass-data memory. This ensures that an authentication is always negative in relation to nontrusted terminals therefore not present on the list. Thus, untrusted terminals are excluded in such a way that they cannot pass positively through an authentication process in relation to the mass-data memory and are therefore also not granted access to the mass-data memory. In the other direction, the mass-data memory cannot forward data to such untrusted external components.

According to another aspect of the present invention, access to the mass-data memory can be granted as a function of release by the security element. This has the advantage that the security element can optionally perform a corresponding authentication with other components, and a data exchange with external components can take place only with positive authentication. The security element can thus control the access to the mass-data memory and, if necessary, implement rights management.

According to another aspect of the present invention, the security element is secured against manipulation by control commands and/or structural features. This has the advantage that both structural features and control commands can be provided that prevent manipulation of the security element. According to the invention, a separate security element is provided that can be secured with greater technical effort and expense than the mass-data memory itself. In this form, the effort and expense is then limited to the security element, and conventional data carriers can for example be retrofitted.

According to another aspect of the present invention, the mass-data memory is present as a solid-state disk and/or a magnetic disk hard disk. Thus, either a solid-state disk or a magnetic disk hard disk, i.e. a conventional hard disk, can be present. However, it is also possible to implement the mass-data memory as a hybrid hard disk so as to provide a flash memory and also provide structural features of a conventional hard disk. Thus, structural features of both hard disk types, of both SSD and HDD, are provided. A person skilled in the art recognizes here as well, however, that he can secure additional mass-data memories with the security element according to the invention. Accordingly, it is preferred that a flash memory be secured by the proposed security element.

According to another aspect of the present invention, the mass-data memory comprises at least one interface from among a group of interfaces, the group comprising: M.2, SATA, mSATA, PCI, PCie, and USB. This has the advantage that conventional interfaces can be reused in relation to the mass-data memory. For instance, it is possible to upgrade conventional mass-data memories according to the invention or to provide a mass-data memory that can be addressed with common interfaces. A person skilled in the art will recognize that the list is merely exemplary. Any and all data memories or interfaces compatible with the listed standards are also relevant. In particular, only one family name is used for the respective standard. A person with average skill in the art recognizes, for example, that USB refers to USB 1.0, USB 2.0, USB 3.0, and other versions. Overall, the proposed interface refers to all common interfaces such as those installed on personal computers. Furthermore, the data interface does not have to be wired, but rather be wireless.

In addition, the memory contents of the mass-data memory can be encrypted or decrypted by a generated and securely introduced cryptographic key managed and/or provided by the security element SE. Furthermore, additional functions or functional extensions and functional changes can be securely added, changed, or removed by so-called applets in the SE. Moreover, data of the mass memory can be signed, or a possibly existing signature can be checked.

According to one aspect of the present invention, other external data carriers (for example external media, storage media, virtual media, etc.) then associated only logically with the SE. A use of the security element SE for corresponding functions outside the device operating system for example through UEFI BIOS, micro-controller firmware, etc., is also proposed.

Furthermore, in the case of a file/document management system the corresponding file is to remain encrypted and/or opening is to be denied through withdrawal or lapsing of validity of keys for signing and/or for encryption or decryption.

According to one aspect of the present invention, the object is also achieved by a method of providing a storage system for secure authentication that includes providing a mass-data memory, a security element communicatively coupled with the mass-data memory, and the security element providing unique authentication information on the basis of which the mass-data memory can be unambiguously authentified in relation to other computer components.

According to one aspect of the present invention, the object is achieved by a computer program product with control commands that implement the proposed method or operate the proposed storage system.

According to the invention, it is especially advantageous that the structural features of the storage system can also be implemented as corresponding method steps. Furthermore, the proposed method is suitable for operating the storage system to which end the proposed control commands can for example be used.

Figure 2:
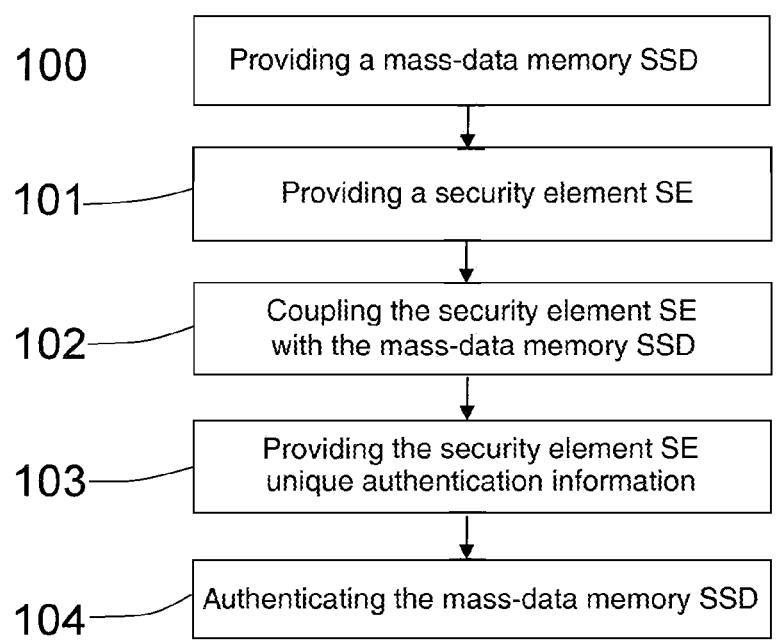

Additional advantageous embodiments will be explained in greater detail with reference to the enclosed figures. In the drawing:

FIG. 1 shows a storage system according to one aspect of the present invention; and FIG. 2 is a schematic flowchart of a method of providing or of operating the storage system according to the invention.

FIG. 1 shows a schematic diagram in which the mass-data memory is embodied as a so-called solid-state disk SSD. Here, the security element SE is on a circuit board with the mass-data memory. Data communication takes place via a bus system to which end corresponding feet are on the security element. Depending on the embodiment of the storage system the card shown in FIG. 1 can be referred to as a mass-data memory or also as a storage system. It is thus possible for the card shown in its entirety to act as a mass memory, in which case the security element is only placed on top. Furthermore, it is also possible for the large, substantially central block to be referred to as a mass-data memory. A person skilled in the art recognizes that it is essential to the invention that only one security element needs to be set up in relation to a mass-data memory, regardless of how it is designed. Furthermore, a person skilled in the art recognizes that additional components typical of a mass-data memory are to be provided.

The combination of mass-data memory SSD with a secure element, also called a cryptotoken, is shown by way of example on an M.2 SATA plug-in module. Through installation on a PC, a loss of identification or the manipulation thereof is prevented or made substantially more difficult. Accordingly, it is possible according to the invention to securely identify a device on a network. Furthermore, secure authentication/authentification between built-in secure element and common authentication/authentification measures such as user name and password, smart card and password, OTP and password, or also just OTP can be implemented. Two synchronized OTP mechanisms can also be implemented, for example, as an internal security element and external device (smart phone with OTP function, embedded security element) or the like. Furthermore, the device can be validated during a process. Furthermore, a software license anchor, i.e. a memory with license information, can be implemented. Key generation in the device for data signing and secure product identification according to the keyword Industry 4.0 is also possible. Moreover, identities of IoT sensors or devices can be encoded. Furthermore, it is possible to sign system changes, such as in the case of an update, for example. The encryption of data and data carriers or partitions and storage of the key in the security element is also advantageous. Furthermore, a white list of permitted external devices can be implemented that comprises a USB stick, a mobile phone, a keyboard, a mouse, a display, or the like, that can be connected to the PC. This can also provide security against a "bad USB device" such as a key logger.

Depending on the applet loaded in the security element, various applications can be implemented. As is common a smart-card can be managed remotely. PC applications including the operating system can be securely integrated via middleware software and/or a driver with the security element. The device boot process can be secured through interaction between the signed UEFI/EFI BIOS and the security element. The two identify one another. Only then does the system including the operating system start.

In this way, the invention solves the problem that conventional mass-data memory devices do not have secure elements, making unequivocal, secure identification impossible if a security mechanism implemented in hardware technology is lost. The key of a smart card terminal is typically implemented only in software and not as hardware. Other known methods, such as TPM and TrustZone, cannot be updated and are not manageable.

This is achieved according to the invention through the provision of a combination of mass-data memory, for example SSD, with a security element, for example a cryptotoken on a module, for example BM2 SATA plug-in module. This provides the advantage that, when installed on the PC, a loss of identification or manipulation is made substantially more difficult. The applications loaded in the security element can be managed remotely, and the device boot process is safeguarded by interaction between the signed BIOS and the security element.

FIG. 2 is a schematic flowchart of a method of providing a storage system for secure authentification that includes the step 100 of providing a mass-data memory SSD, the step 101 of providing a security element SE, the step 102 of communicatively coupling the security element SE with the mass-data memory SSD, and the step 103 of providing the security element SE unique authentication information on the basis of which the mass-data memory SSD can be unambiguously authentified 104 in relation to other computer components. A person skilled in the art recognizes here that the aforementioned method steps can be carried out iteratively and/or in another order.

A computer program product with control commands that implement the method or operate the proposed storage system is not shown herein.

The invention claimed is:

1. A method of making a secure storage system having authentication and cryptographic data protection, the method comprising the steps of:
    providing a mass-data memory;
    providing a security element;
    inseparably coupling the security element with the mass-data memory;
    controlling the mass-data memory and the securing element by
respective different control commands installed to operate the mass-data memory and the security element, the control commands operating the security element being updated by a component external to the storage system;
    interposing a secured hardware data interface between the mass-data memory and the security element;
    the security element providing security-critical information
concerning the data of the mass-data memory, the security-critical information being an access authorization, an identity of the mass-data memory, a cryptographic key, a data signature, a time stamp, and/or a validity period of data; and
    restricting access to the mass-data memory only as a function of release by the security element.

2. The method according to claim 1, further comprising the step of:
    the security element providing a unique key enabling the mass-data memory to be authenticated in relation to other computer components or carrying out a cryptographic operation with respect to data stored in the mass-data memory.

3. The method according to claim 2, wherein the unique key for use in secure encrypting or decrypting the data of the mass-data memory is used.

4. The method according to claim 1, further comprising:
    generating or storing the security-critical information with the security element.

5. The method according to claim 1, further comprising the step of:
    the security element supplying control commands.

6. The method according to claim 1, further comprising the step of:
    the security element signing, encrypting, or decrypting data of the mass-data memory.

7. The method according to claim 1, wherein the mass-data memory and the security element have separate memory areas or separate arithmetic and logic units.

8. The method according to claim 1, wherein at least a part of the security element is on a circuit board together with the mass-data memory.

9. The method according to claim 1, wherein the secured hardware data interface is provided using network components.

10. The method according to claim 1, wherein the mass-data memory is a flash memory, a PRAM, an MRAM, a magnetic tape, an optomagnetic memory, an optical memory, a bioelectrical memory, a solid-state disk, or a magnetic disk hard disk.

11. The method according to claim 1, wherein the mass-data memory has at least one interface from among a group of interfaces comprising: an interface according to the ISO/IEC 7816 specification, I2C, SPI, M.2, SATA, mSATA, PCI, PCIe, and USB.

12. A secure storage system with authentication and cryptographic data protection, the storage system comprising:
    a mass-data memory;
    a security element communicatively inseparably coupled with the mass-data memory,
    respective different control commands for the mass-data memory and the security element and installed to operate the mass-data memory and the security element, the control commands operating the security element being updated by a component external to the storage system; and
    a secure hardware data interface interposed between the mass-data memory and the security element, the security element being configured to provide security-critical information concerning the data of the mass-data memory, the security-critical information being an access authorization, an identity of the mass-data memory, a cryptographic key, a data signature, a time stamp, and/or a validity period of data; and
    access to the mass-data memory being restricted only as a function of release by the security element.

* * * * *